United States Patent
Ji et al.

(10) Patent No.: US 11,800,400 B2
(45) Date of Patent: Oct. 24, 2023

(54) TRANSMISSION COLLISION PROCESSING METHOD, TERMINAL, AND CONTROL NODE

(71) Applicant: VIVO MOBILE COMMUNICATION CO., LTD., Guangdong (CN)

(72) Inventors: Zichao Ji, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 7 days.

(21) Appl. No.: 17/213,019

(22) Filed: Mar. 25, 2021

(65) Prior Publication Data

US 2021/0219170 A1  Jul. 15, 2021

Related U.S. Application Data

(63) Continuation of application No. PCT/CN2019/102212, filed on Aug. 23, 2019.

(30) Foreign Application Priority Data

Sep. 28, 2018 (CN) .......................... 201811143433.7

(51) Int. Cl.
*H04W 28/02* (2009.01)
*H04W 52/26* (2009.01)
(Continued)

(52) U.S. Cl.
CPC ....... *H04W 28/0294* (2013.01); *H04W 52/26* (2013.01); *H04W 52/281* (2013.01); *H04W 74/0825* (2013.01)

(58) Field of Classification Search
CPC ..... H04W 88/06; H04W 4/44; H04W 74/085; H04W 74/0841; H04W 74/0825; H04W 28/0294; H04W 52/26; H04W 52/281
See application file for complete search history.

(56) References Cited

U.S. PATENT DOCUMENTS 11,611,952 B2 * 3/2023 MolavianJazi ..... H04W 52/367
2016/0128115 A1  5/2016 Panteleev et al.
(Continued)

FOREIGN PATENT DOCUMENTS

CN   104104476 A   10/2014
CN   105657835 A   6/2016
(Continued)

OTHER PUBLICATIONS

ZTE, "In-device coexistence between NR sidelink and LTE sidelink," 3GPP TSG RAN WG1 Meeting #94, R1-1808609, pp. 1-4, (Aug. 10, 2018).
(Continued)

*Primary Examiner* — Robert C Scheibel
(74) *Attorney, Agent, or Firm* — Maschoff Brennan

(57) ABSTRACT

This disclosure provides a transmission processing method, a terminal, and a control node. The method includes: when first transmission collides with second transmission, performing collision processing on the first transmission and the second transmission according to a collision processing policy, where at least one of the first transmission and the second transmission is transmission performed based on a sidelink, and transmission modes of the first transmission and the second transmission are different.

20 Claims, 3 Drawing Sheets

(51) Int. Cl.
*H04W 52/28* (2009.01)
*H04W 74/08* (2009.01)

(56) References Cited

U.S. PATENT DOCUMENTS

| | | |
|---|---|---|
| 2017/0273130 A1 | 9/2017 | Panteleev et al. |
| 2018/0115873 A1 | 4/2018 | Aminaka |
| 2018/0167820 A1 | 6/2018 | Belleschi et al. |
| 2018/0206260 A1 | 7/2018 | Khoryaev et al. |
| 2019/0149365 A1* | 5/2019 | Chatterjee ............ H04W 76/11 370/329 |
| 2019/0319689 A1 | 10/2019 | Wu et al. |
| 2020/0045724 A1* | 2/2020 | Lu ..................... H04W 72/1247 |
| 2021/0328646 A1 | 10/2021 | Wu et al. |
| 2021/0400632 A1* | 12/2021 | Yang ................. H04L 27/26025 |

FOREIGN PATENT DOCUMENTS

| | | |
|---|---|---|
| CN | 107005828 A | 8/2017 |
| CN | 108111200 A | 6/2018 |
| KR | 10-2017-0020274 A | 2/2017 |
| WO | 2016/074416 A1 | 5/2016 |

OTHER PUBLICATIONS

Intel Corporation, "Coexistence Mechanisms for eV2X Services," 3GPP TSG RAN WG1 Meeting #94, R1-1808702, pp. 1-7, (Aug. 11, 2018).

Extended European Search Report dated Nov. 8, 2021 as received in Application No. 19865127.5.

Written Opinion of the International Searching Authority dated Apr. 8, 2021 as received in Application No. PCT/CN2019/102212.

SG Office Action dated Jan. 10, 2023 as received in Application No. 11202103178V.

KR Office Action dated Apr. 30, 2023 as received in Application No. 10-2021-7011552.

* cited by examiner

TRANSMISSION COLLISION PROCESSING METHOD, TERMINAL, AND CONTROL NODE

CROSS-REFERENCE TO RELATED APPLICATIONS

This application is a continuation application of PCT International Application No. PCT/CN2019/102212 filed on Aug. 23, 2019, which claims priority to Chinese Patent Application No. 201811143433.7, filed in China on Sep. 28, 2018, both disclosures of which are incorporated herein by reference in their entireties.

TECHNICAL FIELD

This disclosure relates to the field of communications technologies, and in particular, to a transmission processing method, a terminal, and a control node.

BACKGROUND

In a related art, a user terminal (User Equipment, UE) can perform communication based on a long term evolution (LTE) system. In this mode, data is transmitted between UEs by using a base station and a cellular network. With development of mobile communications technologies, the LTE system also supports sidelink transmission, that is, data can be transmitted between UEs directly at a physical layer.

Currently, with emergence of a 5G new radio (NR) system, because the system can support more advanced sidelink transmission types such as unicast and multicast, the system can support more service types.

When UE supports communication between an LTE sidelink and an NR sidelink, different modules can be used to support different services. However, when a terminal supports a plurality of communication modes, including sidelink communication, because the sidelink communication is in a half-duplex operating mode, a transmission collision may occur if coordination is absent between the communication modes.

However, in the related art, there is no corresponding technical solution about how to manage a transmission collision for a terminal supporting a plurality of communication modes, including sidelink communication.

SUMMARY

Embodiments of this disclosure provide a transmission processing method, a terminal, and a control node.

According to a first aspect, an embodiment of this disclosure provides a transmission processing method, applied to a terminal. The transmission processing method includes:
when first transmission collides with second transmission, performing collision processing on the first transmission and the second transmission according to a collision processing policy, where
at least one of the first transmission and the second transmission is transmission performed based on a sidelink, and transmission modes of the first transmission and the second transmission are different.

According to a second aspect, an embodiment of this disclosure provides another transmission processing method, applied to a control node. The transmission processing method includes:
sending a collision processing policy, where the collision processing policy is used to perform collision processing on first transmission and second transmission that collide, where
at least one of the first transmission and the second transmission is transmission performed based on a sidelink, and transmission modes of the first transmission and the second transmission are different.

According to a third aspect, an embodiment of this disclosure provides a terminal, including:
a collision processing module, configured to: when first transmission collides with second transmission, perform collision processing on the first transmission and the second transmission according to a collision processing policy, where
at least one of the first transmission and the second transmission is transmission performed based on a sidelink, and transmission modes of the first transmission and the second transmission are different.

According to a fourth aspect, an embodiment of this disclosure provides a control node, including:
a first sending module, configured to send a collision processing policy, where the collision processing policy is used to perform collision processing on first transmission and second transmission that collide, where
at least one of the first transmission and the second transmission is transmission performed based on a sidelink, and transmission modes of the first transmission and the second transmission are different.

According to a fifth aspect, an embodiment of this disclosure provides a terminal, including a processor, a memory, and a computer program stored in the memory and capable of running on the processor, where when the computer program is executed by the processor, the steps of the transmission processing method according to the first aspect are implemented.

According to a sixth aspect, an embodiment of this disclosure provides a control node, including a processor, a memory, and a computer program stored in the memory and capable of running on the processor, where when the computer program is executed by the processor, the steps of the transmission processing method according to the second aspect are implemented.

According to a seventh aspect, an embodiment of this disclosure provides a computer-readable storage medium, where the computer-readable storage medium stores a computer program, and when the computer program is executed by a processor, the steps of the transmission processing method according to the first aspect are implemented.

According to an eighth aspect, an embodiment of this disclosure provides a computer-readable storage medium, where the computer-readable storage medium stores a computer program, and when the computer program is executed by a processor, the steps of the transmission processing method according to the second aspect are implemented.

In the embodiments of this disclosure, when the first transmission collides with the second transmission, collision processing is performed on the first transmission and the second transmission according to the collision processing policy, where at least one of the first transmission and the second transmission is transmission performed based on the sidelink, and the transmission modes of the first transmission and the second transmission are different. In this way, during data transmission in a plurality of different transmission modes, the terminal may process a collision in the data transmission according to the collision processing policy, to resolve problems in multi-mode data transmission, such as a sending/receiving collision, a limited power, and interference.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings.

DESCRIPTION OF EMBODIMENTS

Figure 1:
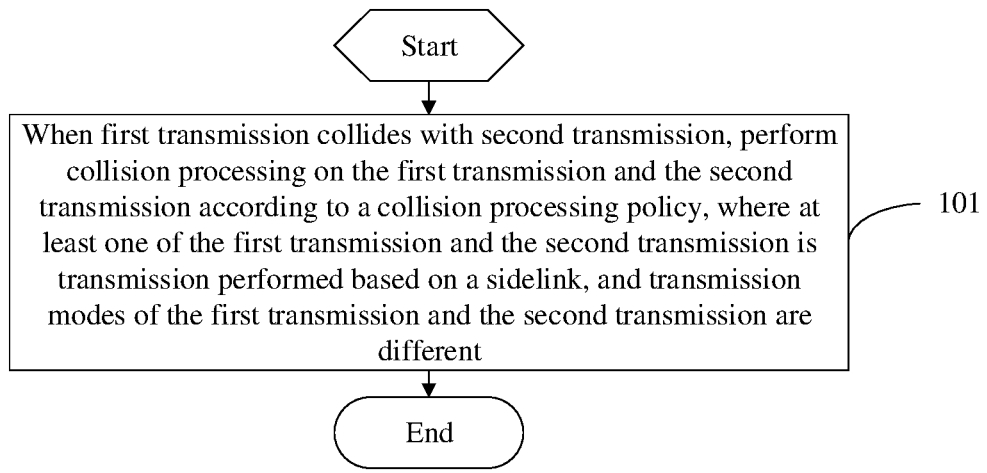
FIG. 1 is a flowchart of a transmission processing method according to an embodiment of this disclosure.

The following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure shall fall within the protection scope of this disclosure.

In the embodiments of this disclosure, a transmission collision management solution is provided for a terminal supporting a plurality of communication modes, including sidelink communication.

For a person skilled in the art to better understand the embodiments of this disclosure, some concepts included in the embodiments of this disclosure are described first.

First, in the embodiments of this disclosure, two transmissions that collide meet the following conditions:

1. Two transmission modes are different.
2. At least one transmission is transmission performed based on a sidelink, and the transmission may be transmission performed based on an LTE sidelink, or may be transmission performed based on an NR sidelink. The other transmission may be transmission performed based on a sidelink, or may be transmission performed based on a Uu interface.

For a terminal supporting a plurality of communication modes, including sidelink communication, when the plurality of modes operate jointly, a transmission collision is possible. Herein, examples of the transmission collision mentioned in the embodiments of this disclosure are given below:

1. Collision Occurs on Sending/Receiving Between Different Interfaces.

For example, a sending operation needs to be performed through an NR sidelink, and a receiving operation needs to be performed through an LTE sidelink. For another example, a receiving operation needs to be performed through an NR sidelink, and a sending operation needs to be performed through a Uu interface. For still another example, a sending operation needs to be performed through an NR sidelink, and a receiving operation needs to be performed through a Uu interface.

In the foregoing cases, a sending/receiving collision may occur. However, this does not constitute a limitation herein.

2. Collision Occurs on Sending Operations Between Different Interfaces.

A transmit power of a terminal is limited to some extent. In addition, sending operations simultaneously performed between different interfaces interfere with each other. Therefore, collision also occurs on the sending operations between different interfaces. For example, sending operations need to be performed through both an NR sidelink and an LTE sidelink. For another example, sending operations need to be performed through both an NR sidelink and an LTE Uu interface. For another example, sending operations need to be performed through both an LTE sidelink and an NR Uu interface.

For another example, due to a terminal capability limitation, a protocol constraint, a resource configuration, and other causes, the terminal can perform a sending operation only on a specific quantity of beams. When a quantity of beams required by the sending operation exceeds the foregoing limit, a transmission collision occurs.

In the foregoing cases, a sending collision may occur. However, this does not constitute a limitation herein.

3. Collision Occurs on Receiving Between Different Interfaces.

Due to a terminal capability limitation, a protocol constraint, a resource configuration, and other causes, collision may also occur on receiving operations simultaneously performed between different interfaces. For example, UE can perform a receiving operation only on a specific quantity of frequencies. When a quantity of frequencies corresponding to the receiving operation exceeds the foregoing limit, a transmission collision occurs.

For another example, due to a terminal capability limitation, a protocol constraint, a resource configuration, and other causes, the terminal can perform a receiving operation only on a specific quantity of beams. When a quantity of beams required by the receiving operation exceeds the foregoing limit, a transmission collision occurs.

Certainly, the foregoing are merely examples for describing possible cases/scenarios of transmission collisions, and causes of transmission collisions are not limited in specific embodiments of this disclosure.

FIG. 1 is a flowchart of a transmission processing method according to an embodiment of this disclosure. The method is applied to a terminal. As shown in FIG. 1, the method includes the following steps.

Step 101: When first transmission collides with second transmission, perform collision processing on the first transmission and the second transmission according to a collision processing policy.

At least one of the first transmission and the second transmission is transmission performed based on a sidelink, and transmission modes of the first transmission and the second transmission are different.

The first transmission and the second transmission have been described above. On one hand, the transmission modes of the first transmission and the second transmission are different. On the other hand, at least one of the first transmission and the second transmission is transmission performed based on the sidelink, and the transmission may be transmission performed based on an LTE sidelink, or may be transmission performed based on an NR sidelink, or may even be transmission performed based on a sidelink supported by another communications system in the future. The other transmission may be transmission performed based on a sidelink, or may be transmission performed based on a Uu interface.

In a specific embodiment of this disclosure, the collision processing policy may be protocol-predefined, preconfigured, or control node-configured. The collision processing policy is used to indicate UE how to perform processing when the foregoing transmission collision occurs. For example, when the UE needs to send data based on an NR sidelink and also needs to receive data based on an LTE sidelink, the collision processing policy may provide a solution, to indicate the UE how to process the sending/receiving collision. A specific transmission collision policy may be ensuring LTE data-based normal sending/receiving, and discarding NR data-based sending/receiving or reducing an NR data-based transmit power. In the foregoing manner, the UE receives LTE sidelink-based data, and gives up to send NR sidelink-based data or reduces a power for sending NR sidelink-based data.

As mentioned above, at least one of the first transmission and the second transmission is transmission performed based on a sidelink, and the transmission may be transmission performed based on an LTE sidelink, or may be transmission performed based on an NR sidelink. It is considered that an NR system is to grow rapidly in a period of time in the future, and gradually become a mainstream communications system. In a specific embodiment of this disclosure, the collision processing policy may be further set and used based on one of the transmissions being NR sidelink-based transmission.

In other words, in a specific embodiment of this disclosure, the sidelink may be a new radio NR sidelink. To be specific, at least one of the first transmission and the second transmission is NR sidelink-based transmission, and the other one of the first transmission and the second transmission may be transmission based on an NR Uu interface, or may be transmission based on an LTE sidelink or transmission based on an LTE Uu interface.

When the UE performs the first transmission and the second transmission, and one of the transmissions is the NR sidelink-based transmission, the first transmission collides with the second transmission due to different transmission modes. In this case, collision processing may be performed on the first transmission and the second transmission according to the collision processing policy. For example, data sending/receiving based on a specific network or interface is preferentially ensured, or sending/receiving of data with a high priority in a QoS indication is preferentially ensured, or sending/receiving of some specific types of service data is preferentially ensured.

In this way, when the terminal encounters a sending/receiving collision when transmitting NR sidelink-based data, a predefined collision processing policy may be used for collision processing, to rapidly address a sending/receiving collision in multi-mode data transmission of the terminal.

In a specific embodiment of this disclosure, the collision processing policy may be designed based on different scenarios, different service types, and the like. For example, the collision processing policy may be related to at least one of the following:

an interface type parameter, a quality of service QoS parameter, a service type, a channel type parameter, a signal type parameter, a transmission resource frequency parameter, a resource pool priority parameter, a resource pattern priority parameter, a data transmission type parameter, a resource allocation mode, a resource allocation object parameter, a mapping relationship between a transmission parameter and a collision weight, and a terminal capability parameter.

This is separately described below.

The collision processing policy may be related to the interface type parameter. To be specific, which transmission is to be given up, a transmit power of which transmission is to be reduced, or the like may be decided based on interface types of the first transmission and the second transmission. For example, when the interface types of the first transmission and the second transmission are different (for example, the interface types of the first transmission and the second transmission are an NR-based sidelink/Uu interface and an LTE-based sidelink/Uu interface respectively, or an NR-based sidelink interface and an NR-based Uu interface respectively), first target transmission is discarded, or a transmit power of the first target transmission is reduced, where the first target transmission is transmission, of the first transmission and the second transmission, that is determined based on an interface type parameter.

Several more specific policies are as follows:

When one of the first transmission and the second transmission is transmission performed based on a sidelink, and the other one is transmission performed based on a Uu interface, the first target transmission may be the transmission performed based on the sidelink, in other words, the transmission performed based on the Uu interface is preferentially ensured;

or when one of the first transmission and the second transmission is transmission performed based on LTE, and the other one is transmission performed based on NR, the first target transmission is the transmission performed based on NR, in other words, the transmission performed based on LTE is preferentially ensured.

In this way, transmission, of the first transmission and the second transmission, that is performed based on the sidelink or NR is to be discarded, or a transmit power of the transmission is to be reduced, and transmission, of the first transmission and the second transmission, that is performed based on a Uu interface or LTE is to be normally performed, so as to ensure that the terminal preferentially performs most basic data transmission.

Certainly, a policy opposite to the foregoing policy may be alternatively used, and the policy may be correspondingly set according to an actual service requirement, a user requirement, and the like.

Alternatively, the collision processing policy may be related to a QoS parameter. To be specific, which transmission is to be given up, a transmit power of which transmission is to be reduced, or the like may be decided based on a QoS parameter (for example, a delay parameter or a priority parameter) corresponding to transmission.

For example, when QoS indicators corresponding to the first transmission and the second transmission are different (for example, a QoS indicator corresponding to the first transmission indicates that transmitted data has a higher priority or a lower delay, and a QoS indicator corresponding to the second transmission indicates that transmitted data has a lower priority or a higher delay), second target transmission may be discarded, or a transmit power of the second target transmission may be reduced, where the second target transmission is transmission, of the first transmission and the second transmission, that corresponds to a lower priority or a higher delay budget.

In this way, transmission, of the first transmission and the second transmission, in which transmitted data has a lower priority or a higher delay budget is to be discarded, or a transmit power of the transmission is to be reduced, and transmission, of the first transmission and the second transmission, in which transmitted data has a higher priority or a lower delay budget is to be normally performed, so as to ensure that, in the two transmissions that collide, transmission of data with a high priority is preferentially ensured, or transmission of data with a low delay is preferentially ensured.

Alternatively, the collision processing policy may be related to a service type. To be specific, which transmission is to be given up, a transmit power of which transmission is to be reduced, or the like may be decided based on service types corresponding to data transmitted in the first transmission and the second transmission. For example, when service types corresponding to the first transmission and the second transmission are different, third target transmission may be discarded, or a transmit power of the third target transmission may be reduced, where the third target transmission is transmission, of the first transmission and the second transmission, that corresponds to a service type with a higher priority, or transmission, of the first transmission and the second transmission, that corresponds to a service type not belonging to a preset service type.

In this manner, priorities of different service types may be predefined, or some special types of services may be preset. For example, it is predefined that a service of a basic safety type has a higher priority or a basic safety type is a preset service type, to ensure that service data of the basic safety type is preferentially transmitted. For example, a communication connection is established between a terminal and an in-vehicle terminal. When the terminal needs to send information of a safe driving type to the in-vehicle terminal and also needs to answer an incoming call from another terminal, the terminal may give up to answer the incoming call, but preferentially send the information of the safe driving type to the in-vehicle terminal, to ensure driving safety for a user.

For example, the first transmission is sending a safe driving message or a public safety affair message (for example, information about a place at which a disaster such as a fire or an earthquake happens) based on an LTE sidelink, and the second transmission is sending a road condition message (for example, a road congestion message) or a public safety affair based on an NR Uu interface. Comparatively, the real-time safe driving message or public safety affair message is more important. In this case, according to the collision processing policy, when the terminal needs to simultaneously perform the first transmission and the second transmission, the sending of the road condition message is to be given up, to ensure the sending of the safe driving message or the public safety affair message based on the LTE sidelink.

In the foregoing manner, transmission, of the first transmission and the second transmission, that corresponds to a service type with a lower priority or not belonging to a preset service type is to be discarded, or a transmit power of the transmission is to be reduced, and transmission, of the first transmission and the second transmission, that corresponds to a service type with a higher priority or belonging to a preset service type is to be normally performed, so as to ensure that the terminal preferentially performs data transmission for some specific service types.

Alternatively, the collision processing policy may be related to a channel type parameter or a signal type parameter. To be specific, which transmission is to be given up, a transmit power of which transmission is to be reduced, or the like may be decided based on channel types or signal types of the first transmission and the second transmission. For example, when channel types or signal types corresponding to the first transmission and the second transmission are different (for example, data of some specific types of channels or signals is transmitted in the first transmission, and data of other types of channels or signals is transmitted in the second transmission), fourth target transmission may be discarded, or a transmit power of the fourth target transmission may be reduced, where the fourth target transmission is transmission, of the first transmission and the second transmission, that corresponds to a channel type or a signal type with a higher priority, or transmission, of the first transmission and the second transmission, that corresponds to a channel type or a signal type not belonging to a preset type.

The terminal may predefine priorities of different channel types or signal types, or predefine some special types of channels or signals. For example, it predefines that a random access channel (RACH), a physical sidelink control channel (PSCCH), and a physical sidelink shared channel (PSSCH) have higher priorities, and a channel state information (CSI) feedback and a physical sidelink broadcast channel (PSBCH) have lower priorities, or the RACH, PSCCH, and PSSCH channels are preset channel types, to ensure that data of the RACH, PSCCH, and PSSCH channels are preferentially transmitted.

In this way, transmission, of the first transmission and the second transmission, that corresponds to a channel type or a signal type with a lower priority or not belonging to a preset channel type or signal type is to be discarded, or a transmit power of the transmission is to be reduced, and transmission, of the first transmission and the second transmission, that corresponds to a channel type or a signal type with a higher priority or belonging to a preset channel type or signal type is to be normally performed, so as to ensure that the terminal preferentially performs data transmission for some specific channel types or signal types.

Alternatively, the collision processing policy may be related to a transmission resource frequency parameter. For example, when frequency parameters of transmission resources corresponding to the first transmission and the second transmission are different (for example, a frequency of a transmission resource corresponding to the first transmission is a specific frequency band or frequency, such as an intelligent transport system (ITS) frequency band, and a frequency of a transmission resource corresponding to the second transmission is another frequency band or frequency), fifth target transmission may be discarded, or a transmit power of the fifth target transmission may be reduced, where the fifth target transmission is transmission, of the first transmission and the second transmission, that corresponds to a transmission resource whose frequency parameter has a higher priority, or transmission, of the first transmission and the second transmission, that corresponds to a transmission resource whose frequency parameter does not belong to a preset frequency parameter.

The terminal may predefine priorities of different frequency parameters, or predefine some special frequency bands or frequencies. For example, it predefines that the ITS frequency band has a higher priority, or the ITS frequency band is a preset frequency parameter. For example, when receiving a traffic broadcast information request from the ITS frequency band in a process of receiving a radio signal on a specific frequency band, an in-vehicle terminal may suspend receiving the radio signal, but preferentially receive traffic broadcast information on the ITS frequency band.

In this way, transmission, of the first transmission and the second transmission, that corresponds to a transmission resource whose frequency parameter has a lower priority or does not belong to a preset frequency parameter is to be discarded, or a transmit power of the transmission is to be reduced, and transmission, of the first transmission and the second transmission, that corresponds to a transmission resource whose frequency parameter has a higher priority or belongs to a preset frequency parameter is to be normally performed, so as to ensure that the terminal preferentially performs data transmission for some specific frequency parameters.

Alternatively, the collision processing policy may be related to a resource pool priority parameter or a resource pattern priority parameter. To be specific, which transmission is to be given up, a transmit power of which transmission is to be reduced, or the like may be decided based on resource pool priority parameters or resource pattern priority parameters of the first transmission and the second transmission. For example, when transmission resource pools or transmission resource patterns corresponding to the first transmission and the second transmission are different (for example, the first transmission corresponds to a first transmission resource pool or a first transmission resource pattern, and the second transmission corresponds to a second transmission resource pool or a second transmission resource pattern), sixth target transmission may be discarded, or a transmit power of the sixth target transmission may be reduced, where the sixth target transmission is transmission, of the first transmission and the second transmission, that corresponds to a transmission resource pool or a transmission resource pattern with a higher priority, or transmission, of the first transmission and the second transmission, that corresponds to a transmission resource pool or a transmission resource pattern not belonging to a preset transmission resource pool or transmission resource pattern.

The terminal may predefine priorities of different transmission resource pools or transmission resource patterns, or predefine some special transmission resource pools or transmission resource patterns.

In this way, transmission, of the first transmission and the second transmission, that corresponds to a transmission resource pool or a transmission resource pattern with a lower priority or not belonging to a preset transmission resource pool or transmission resource pattern is to be discarded, or a transmit power of the transmission is to be reduced, and transmission, of the first transmission and the second transmission, that corresponds to a transmission resource pool or a transmission resource pattern with a higher priority or belonging to a preset transmission resource pool or transmission resource pattern is to be normally performed, so as to ensure that the terminal preferentially performs data transmission for some specific transmission resource pools or transmission resource patterns.

Alternatively, the collision processing policy may be related to a data transmission type parameter. To be specific, which transmission is to be given up, a transmit power of which transmission is to be reduced, or the like may be decided based on data transmission types of the first transmission and the second transmission. For example, when data transmission types corresponding to the first transmission and the second transmission are different (for example, a data transmission type corresponding to the first transmission is a unicast or multicast type, and a data transmission type corresponding to the second transmission is a broadcast type), seventh target transmission may be discarded, or a transmit power of the seventh target transmission may be reduced, where the seventh target transmission is transmission, of the first transmission and the second transmission, that corresponds to a data transmission type with a higher priority, or transmission, of the first transmission and the second transmission, that corresponds to a data transmission type not belonging to a preset data transmission type.

The terminal may predefine priorities of different data transmission types, or predefine some special data transmission types. For example, it predefines that the unicast or multicast type has a higher priority, and the broadcast type has a lower priority, or the unicast or multicast type is a preset data transmission type. For example, when receiving a voice call request or a video call request in a process of receiving a radio broadcast signal, the terminal may suspend receiving the radio broadcast signal, and preferentially receive the voice call request or the video call request, to ensure that a voice call or a video call is normally performed.

In this way, transmission, of the first transmission and the second transmission, that corresponds to a data transmission type with a lower priority or not belonging to a preset data transmission type is to be discarded, or a transmit power of the transmission is to be reduced, and transmission, of the first transmission and the second transmission, that corresponds to a data transmission type with a higher priority or belonging to a preset data transmission type is to be normally performed, so as to ensure that the terminal preferentially performs data transmission for some specific data transmission types.

Alternatively, the collision processing policy may be related to a resource allocation mode parameter or a resource allocation object parameter. To be specific, which transmission is to be given up, a transmit power of which transmission is to be reduced, or the like may be decided based on resource allocation modes or resource allocation objects of the first transmission and the second transmission.

For example, when resource allocation objects corresponding to the first transmission and the second transmission are different (for example, a resource allocation object corresponding to the first transmission is a control node, and a resource allocation object corresponding to the second transmission is the terminal itself), eighth target transmission may be discarded, or a transmit power of the eighth target transmission may be reduced, where the eighth target transmission is transmission, of the first transmission and the second transmission, that corresponds to a resource allocation object with a higher priority, or transmission, of the first transmission and the second transmission, that corresponds to a resource allocation object not belonging to a preset resource allocation object. The terminal may predefine priorities of different resource allocation objects, or predefine some special resource allocation objects.

Alternatively, when resource allocation modes corresponding to the first transmission and the second transmission are different (for example, a resource allocation mode corresponding to the first transmission is a scheduling resource allocation mode, and a resource allocation mode corresponding to the second transmission is an autonomous resource selection mode), ninth target transmission may be discarded, or a transmit power of the ninth target transmission may be reduced, where the ninth target transmission is transmission, of the first transmission and the second transmission, that corresponds to a resource allocation mode with a higher priority, or transmission, of the first transmission and the second transmission, that corresponds to a resource allocation mode not belonging to a preset resource allocation mode.

The terminal may predefine priorities of different resource allocation modes, or predefine some special resource allocation modes. For example, it predefines that the scheduling resource allocation mode has a higher priority, and the autonomous resource selection mode has a lower priority, or the scheduling resource allocation mode is a preset resource allocation mode.

In this way, transmission, of the first transmission and the second transmission, that corresponds to a resource allocation object or a resource allocation mode with a lower priority or not belonging to a preset resource allocation object or a preset resource allocation mode is to be discarded, or a transmit power of the transmission is to be reduced, and transmission, of the first transmission and the second transmission, that corresponds to a resource allocation object or a resource allocation mode with a higher priority or belonging to a preset resource allocation object or a preset resource allocation mode is to be normally performed, so as to ensure that the terminal preferentially performs data transmission for some specific resource allocation objects or resource allocation modes.

Alternatively, the collision processing policy may be related to a mapping relationship between a transmission parameter and a collision weight. Specifically, different collision weights may be allocated, according to a preconfigured rule, to data based on different interfaces or different service types, to establish the mapping relationship between a transmission parameter and a collision weight. Then sending/receiving of which group of data is to be preferentially ensured and which group of data is to be discarded are decided by comparing collision weights corresponding to the first transmission and the second transmission. For example, the collision processing policy may be calculating the collision weights of the first transmission and the second transmission based on the mapping relationship between a transmission parameter and a collision weight, determining tenth target transmission from the first transmission and the second transmission, and discarding the tenth transmission, or reducing a transmit power of the tenth target transmission. The tenth target transmission may be transmission, of the first transmission and the second transmission, that has a larger or smaller collision weight. The mapping relationship between a transmission parameter and a collision weight may be predefined, and the collision weights of the first transmission and the second transmission may be calculated based on the mapping relationship.

Alternatively, the collision processing policy may be related to a terminal capability parameter. To be specific, which transmission is to be given up, a transmit power of which transmission is to be reduced, or the like may be decided based on terminal capability parameters required by the first transmission and the second transmission or a capability parameter of the terminal. For example, the collision processing policy is a policy that is selected by the terminal or a control node from a plurality of collision processing policies based on the terminal capability parameter (for example, a quantity of antennas or whether a specific capability is supported) and that matches the terminal capability parameter. For another example, when the first transmission and the second transmission correspond to different capability requirement information, transmission with a higher capability requirement or a lower capability requirement may be discarded. It should be noted that the first target transmission to the tenth target transmission all include data receiving and data sending.

In this way, in this implementation, in different scenarios and different service types, the collision processing policy may be related to the foregoing different parameters, so that different transmission collision scenarios may correspond to different collision processing policies, and the terminal may select one or more of the collision processing policies based on an actual transmission case, to process a collision that occurs in the first transmission and the second transmission.

In a specific embodiment of this disclosure, the collision processing policy may be a protocol-predefined policy, a preconfigured policy, or a control node-configured policy.

The collision processing policy may be protocol-predefined. For example, a communication protocol used by the terminal predefines how to process a sending/receiving collision in data transmission. Alternatively, the collision processing policy may be preconfigured. For example, a vendor or an operator preconfigures, for the terminal, how to process a sending/receiving collision in data transmission. Alternatively, the collision processing policy may be control node-configured. For example, different collision processing policies are configured for different transmission nodes, so that the terminal may determine a corresponding collision processing policy based on a control node to which the first transmission and the second transmission belong.

When the collision processing policy is control node-configured, the terminal further includes a step of receiving the collision processing policy sent by the control node.

In this way, in this implementation, the terminal may perform collision processing on the first transmission and the second transmission according to the protocol-predefined collision processing policy, the preconfigured collision processing policy, or the control node-configured collision processing policy.

Optionally, a validation condition for the collision processing policy is a protocol-predefined trigger condition, a preconfigured validation condition, or a control node-configured validation condition.

In a specific embodiment of this disclosure, the validation condition may be configured for each single collision processing policy (for example, the validation condition may be related to a terminal capability), or may be a validation condition configured for a group of collision processing policies. In this case, the validation condition is selecting one collision processing policy from a group of collision processing policies for decision-making.

When there are a plurality of different collision processing policies, configuring a validation condition for a group of collision processing policies can resolve a problem about how to select one of the collision processing policies as a basis for currently performing collision processing on the first transmission and second transmission.

The validation condition for the collision processing policy may be the protocol-predefined trigger condition. For example, a communication protocol used by the terminal predefines the validation condition for the collision processing policy. Alternatively, the validation condition for the collision processing policy may be the preconfigured validation condition. For example, a vendor or an operator preconfigures, for the terminal, how to process a collision in data transmission. Alternatively, the validation condition for the collision processing policy may be the control node-configured validation condition. For example, different collision processing policy validation conditions are configured for different transmission nodes, so that the terminal may determine a validated collision processing policy based on a control node to which the first transmission and the second transmission belong.

Specifically, when the terminal predefines or preconfigures a plurality of collision processing policies, different validation conditions may be set for the plurality of collision processing policies, so that different collision processing policies may be used in different data transmission scenarios. For example, different priorities may be set for the plurality of collision processing policies. When different results are determined after collision processing is performed on the first transmission and the second transmission by using different collision processing policies, processing may be performed based on a result determined according to a collision processing policy with a higher priority, or collision processing may be performed on the first transmission and the second transmission directly according to a collision processing policy with a higher priority.

In this way, in this implementation, the validation condition for the collision processing policy may be determined based on the protocol-predefined trigger condition, the preconfigured validation condition, or the control node-configured validation condition, and then collision processing is performed on the first transmission and the second transmission according to a validated collision processing policy.

Optionally, the collision processing policy includes a collision processing operation, and the collision processing operation includes at least one of the following operations: a discarding operation of receiving, a discarding operation of sending, and transmit power reduction.

The collision processing policy includes a collision processing operation, and the collision processing operation includes at least one of a discarding operation of receiving, a discarding operation of sending, and transmit power reduction. For example, the collision processing operation may be the discarding operation of receiving, the discarding operation of sending, or the transmit power reduction; may be the discarding operation of receiving and the transmit power reduction; or the like.

For example, when the first transmission is in a data receiving mode and the second transmission is in a data sending mode, if the collision processing operation included in the collision processing policy is the discarding operation of sending or the transmit power reduction, the first transmission may be retained, and the second transmission may be given up, or a data transmit power of the second transmission may be reduced; or if the collision processing operation included in the collision processing policy is the discarding operation of receiving or the transmit power reduction, the first transmission may be given up, and a data transmit power of the second transmission may be reduced.

In this way, in this implementation, at least one of the discarding operation of receiving, the discarding operation of sending, the transmit power reduction, and the like may be used to address a sending/receiving collision, a limited power, or another problem that occurs when the terminal simultaneously performs the first transmission and the second transmission.

In this embodiment of this disclosure, the terminal may be any device with a storage medium, for example, a terminal device such as a computer, a mobile phone, a tablet computer, a laptop computer, a personal digital assistant (PDA), a mobile Internet device (MID), or a wearable device.

In the transmission processing method in this embodiment, during data transmission in a plurality of different transmission modes, the terminal may process a collision in the data transmission according to the collision processing policy, to resolve problems in multi-mode data transmission, such as a sending/receiving collision, a limited power, and interference.

Figure 2:
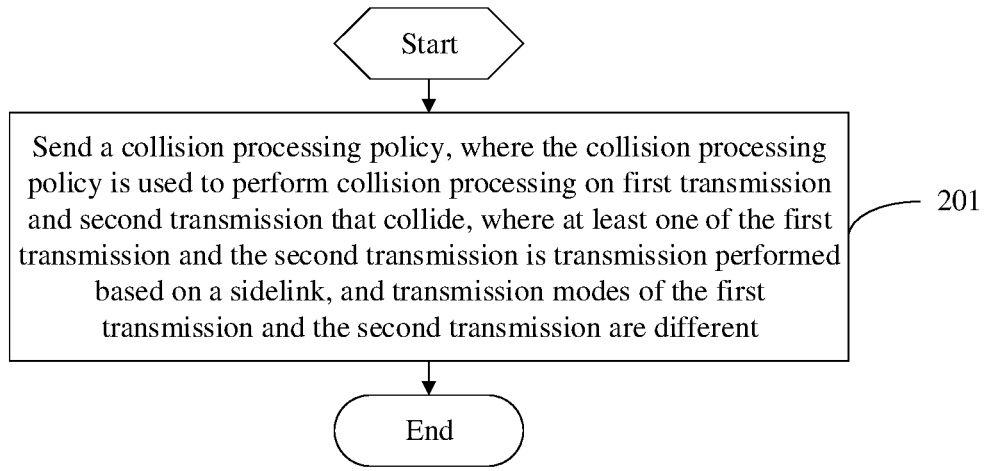
FIG. 2 is a flowchart of another transmission processing method according to an embodiment of this disclosure.

FIG. 2 is a flowchart of another transmission processing method according to an embodiment of this disclosure. The method is applied to a control node. As shown in FIG. 2, the method includes the following steps.

Step 201: Send a collision processing policy, where the collision processing policy is used to perform collision processing on first transmission and second transmission that collide.

At least one of the first transmission and the second transmission is transmission performed based on a sidelink, and transmission modes of the first transmission and the second transmission are different.

It should be understood that, in a specific embodiment of this disclosure, the control node may be a network-side device, or may be a terminal playing a controlling role in an entire network.

In this embodiment, the control node may send the collision processing policy to a terminal, so that the terminal may perform collision processing according to the collision processing policy when a transmission collision occurs. For interpretations of the first transmission, the second transmission, and the collision processing policy, refer to the related descriptions in the method embodiment shown in FIG. 1. To avoid repeated descriptions, details are not described in this embodiment again.

Optionally, the sidelink is a new radio NR sidelink.

For interpretations of the NR sidelink, refer to the related descriptions in the method embodiment shown in FIG. 1. To avoid repeated descriptions, details are not described in this embodiment again.

Optionally, the collision processing policy is related to at least one of the following:
an interface type parameter, a QoS parameter, a service type, a channel type parameter, a signal type parameter, a transmission resource frequency parameter, a resource pool priority parameter, a resource pattern priority parameter, a data transmission type parameter, a resource allocation mode, a resource allocation object parameter, and a mapping relationship between a transmission parameter and a collision weight.

For descriptions of this implementation, refer to the related descriptions in the method embodiment shown in FIG. 1. To avoid repeated descriptions, details are not described in this embodiment again.

Optionally, the transmission processing method further includes:
sending a validation condition for the collision processing policy.

In this implementation, when there are a plurality of collision processing policies, the control node may further send the validation condition for the collision processing policy to the terminal, to negotiate on how to select one of the plurality of collision processing policies as a basis for currently performing collision processing on the first transmission and second transmission.

For interpretations of the validation condition for the collision processing policy, refer to the related descriptions in the method embodiment shown in FIG. 1. To avoid repeated descriptions, details are not described in this embodiment again.

In the transmission processing method in this embodiment, when performing data transmission with the terminal in a plurality of different transmission modes, the control node may send the collision processing policy to the terminal, to negotiate with the terminal on how to process a collision in the data transmission according to the collision processing policy, so as to resolve problems in multi-mode data transmission, such as a sending/receiving collision, a limited power, and interference.

Figure 3:
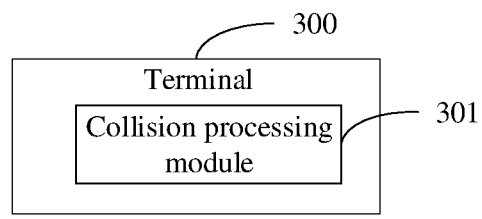
FIG. 3 is a schematic structural diagram of a terminal according to an embodiment of this disclosure.

FIG. 3 is a schematic structural diagram of a terminal according to an embodiment of this disclosure. As shown in FIG. 3, the terminal 300 includes:

a collision processing module 301, configured to: when first transmission collides with second transmission, perform collision processing on the first transmission and the second transmission according to a collision processing policy.

At least one of the first transmission and the second transmission is transmission performed based on a sidelink, and transmission modes of the first transmission and the second transmission are different.

Optionally, the sidelink is a new radio NR sidelink.

Optionally, the collision processing policy is related to at least one of the following:

an interface type parameter, a QoS parameter, a service type, a channel type parameter, a signal type parameter, a transmission resource frequency parameter, a resource pool priority parameter, a resource pattern priority parameter, a data transmission type parameter, a resource allocation mode, a resource allocation object parameter, and a mapping relationship between a transmission parameter and a collision weight.

Optionally, the collision processing policy is a protocol-predefined policy, a preconfigured policy, or a control node-configured policy.

Optionally, a validation condition for the collision processing policy is a protocol-predefined trigger condition, a preconfigured validation condition, or a control node-configured validation condition.

Optionally, the collision processing policy includes a collision processing operation, and the collision processing operation includes at least one of the following operations: a discarding operation of receiving, a discarding operation of sending, and transmit power reduction.

Optionally, the collision processing policy is specifically at least one of the following policies:

when interface types of the first transmission and the second transmission are different, discarding first target transmission, or reducing a transmit power of the first target transmission, where the first target transmission is transmission, of the first transmission and the second transmission, that is determined based on an interface type parameter;

when QoS indicators corresponding to the first transmission and the second transmission are different, discarding second target transmission, or reducing a transmit power of the second target transmission, where the second target transmission is transmission, of the first transmission and the second transmission, that corresponds to a lower priority or a higher delay budget;

when service types corresponding to the first transmission and the second transmission are different, discarding third target transmission, or reducing a transmit power of the third target transmission, where the third target transmission is transmission, of the first transmission and the second transmission, that corresponds to a service type with a higher priority, or transmission, of the first transmission and the second transmission, that corresponds to a service type not belonging to a preset service type;

when channel types or signal types corresponding to the first transmission and the second transmission are different, discarding fourth target transmission, or reducing a transmit power of the fourth target transmission, where the fourth target transmission is transmission, of the first transmission and the second transmission, that corresponds to a channel type or a signal type with a higher priority, or transmission, of the first transmission and the second transmission, that corresponds to a channel type or a signal type not belonging to a preset type;

when frequency parameters of transmission resources corresponding to the first transmission and the second transmission are different, discarding fifth target transmission, or reducing a transmit power of the fifth target transmission, where the fifth target transmission is transmission, of the first transmission and the second transmission, that corresponds to a transmission resource whose frequency parameter has a higher priority, or transmission, of the first transmission and the second transmission, that corresponds to a transmission resource whose frequency parameter does not belong to a preset frequency parameter;

when transmission resource pools or transmission resource patterns corresponding to the first transmission and the second transmission are different, discarding sixth target transmission, or reducing a transmit power of the sixth target transmission, where the sixth target transmission is transmission, of the first transmission and the second transmission, that corresponds to a transmission resource pool or a transmission resource pattern with a higher priority, or transmission, of the first transmission and the second transmission, that corresponds to a transmission resource pool or a transmission resource pattern not belonging to a preset transmission resource pool or transmission resource pattern;

when data transmission types corresponding to the first transmission and the second transmission are different, discarding seventh target transmission, or reducing a transmit power of the seventh target transmission, where the seventh target transmission is transmission, of the first transmission and the second transmission, that corresponds to a data transmission type with a higher priority, or transmission, of the first transmission and the second transmission, that corresponds to a data transmission type not belonging to a preset data transmission type;

when resource allocation objects corresponding to the first transmission and the second transmission are different, discarding eighth target transmission, or reducing a transmit power of the eighth target transmission, where the eighth target transmission is transmission, of the first transmission and the second transmission, that corresponds to a resource allocation object with a higher priority, or transmission, of the first transmission and the second transmission, that corresponds to a resource allocation object not belonging to a preset resource allocation object;

when resource allocation modes corresponding to the first transmission and the second transmission are different, discarding ninth target transmission, or reducing a transmit power of the ninth target transmission, where the ninth target transmission is transmission, of the first transmission and the second transmission, that corresponds to a resource allocation mode with a higher priority, or transmission, of the first transmission and the second transmission, that corresponds to a resource allocation mode not belonging to a preset resource allocation mode; and calculating collision weights of the first transmission and the second transmission based on the mapping relationship between a transmission parameter and a collision weight, determining tenth target transmission from the first transmission and the second transmission, and discarding the tenth transmission, or reducing a transmit power of the tenth target transmission.

Optionally, when one of the first transmission and the second transmission is transmission performed based on a sidelink, and the other one is transmission performed based on a Uu interface, the first target transmission is the transmission performed based on the sidelink;

or when one of the first transmission and the second transmission is transmission performed based on LTE, and the other one is transmission performed based on NR, the first target transmission is the transmission performed based on NR.

The terminal 300 can implement various processes that are implemented by the terminal in the method embodiment of FIG. 1. To avoid repetition, details are not described herein again. During data transmission in a plurality of different transmission modes, the terminal 300 in this embodiment of this disclosure may process a collision in the data transmission according to the collision processing policy, to resolve problems in multi-mode data transmission, such as a sending/receiving collision, a limited power, and interference.

Figure 4:
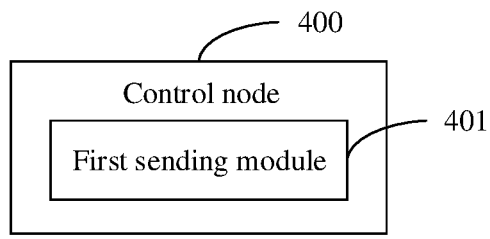
FIG. 4 is a schematic structural diagram of a control node according to an embodiment of this disclosure.

FIG. 4 is a schematic structural diagram of a control node according to an embodiment of this disclosure. As shown in FIG. 4, the control node 400 includes:

a first sending module 401, configured to send a collision processing policy, where the collision processing policy is used to perform collision processing on first transmission and second transmission that collide.

At least one of the first transmission and the second transmission is transmission performed based on a sidelink, and transmission modes of the first transmission and the second transmission are different.

Optionally, the sidelink is a new radio NR sidelink.

Optionally, the collision processing policy is related to at least one of the following:

an interface type parameter, a QoS parameter, a service type, a channel type parameter, a signal type parameter, a transmission resource frequency parameter, a resource pool priority parameter, a resource pattern priority parameter, a data transmission type parameter, a resource allocation mode, a resource allocation object parameter, and a mapping relationship between a transmission parameter and a collision weight.

Figure 5:
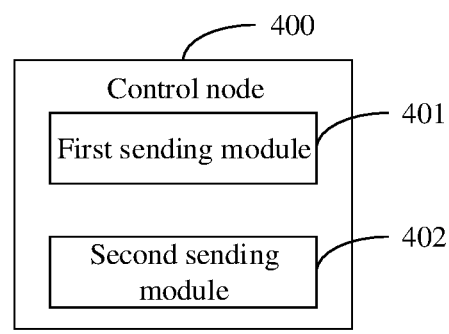
FIG. 5 is a schematic structural diagram of another control node according to an embodiment of this disclosure.

Optionally, as shown in FIG. 5, the control node 400 further includes:

a second sending module 402, configured to send a validation condition for the collision processing policy.

The control node 400 can implement various processes that are implemented by the control node in the method embodiment of FIG. 2. To avoid repetition, details are not described herein again. When performing data transmission with the terminal in a plurality of different transmission modes, the control node 400 in this embodiment of this disclosure may send the collision processing policy to the terminal, so as to negotiate with the terminal on how to process a collision in the data transmission according to the collision processing policy, and resolve problems in multi-mode data transmission, such as a sending/receiving collision, a limited power, and interference.

Figure 6:
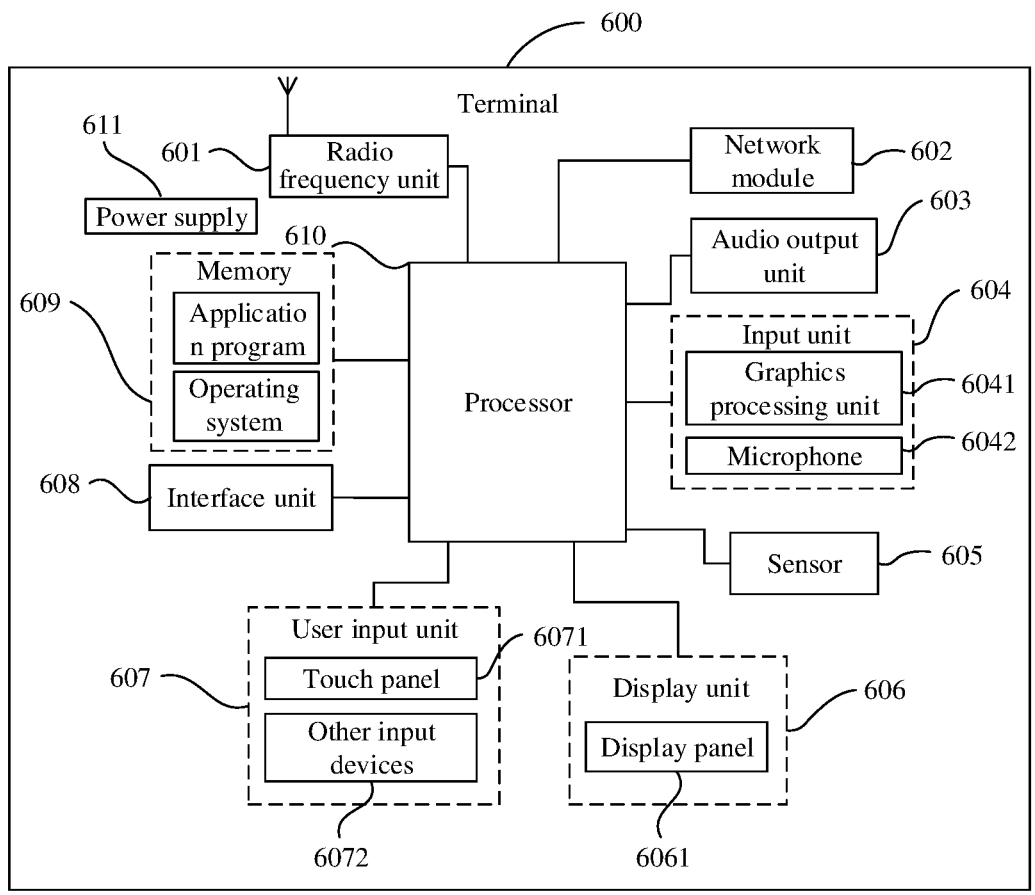
FIG. 6 is a schematic diagram of a hardware structure of a terminal according to an embodiment of this disclosure.

FIG. 6 is a schematic diagram of a hardware structure of a terminal for implementing the embodiments of this disclosure. The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the terminal structure shown in FIG. 6 does not constitute a limitation to the terminal. The terminal may include more or fewer components than those shown in the figure, or some components may be combined, or there may be a different component layout. In this embodiment of this disclosure, the terminal includes, but is not limited to, a mobile phone, a tablet computer, a notebook computer, a palmtop computer, an in-vehicle terminal, a wearable device, a pedometer, and the like.

The processor 610 is configured to: when first transmission collides with second transmission, perform collision processing on the first transmission and the second transmission according to a collision processing policy.

At least one of the first transmission and the second transmission is transmission performed based on a sidelink, and transmission modes of the first transmission and the second transmission are different.

Optionally, the sidelink is a new radio NR sidelink.

Optionally, the collision processing policy is related to at least one of the following:

an interface type parameter, a QoS parameter, a service type, a channel type parameter, a signal type parameter, a transmission resource frequency parameter, a resource pool priority parameter, a resource pattern priority parameter, a data transmission type parameter, a resource allocation mode, a resource allocation object parameter, and a mapping relationship between a transmission parameter and a collision weight.

Optionally, the collision processing policy is a protocol-predefined policy, a preconfigured policy, or a control node-configured policy.

Optionally, a validation condition for the collision processing policy is a protocol-predefined trigger condition, a preconfigured validation condition, or a control node-configured validation condition.

Optionally, the collision processing policy includes a collision processing operation, and the collision processing operation includes at least one of the following operations: a discarding operation of receiving, a discarding operation of sending, and transmit power reduction.

Optionally, the collision processing policy is specifically at least one of the following policies:

when interface types of the first transmission and the second transmission are different, discarding first target transmission, or reducing a transmit power of the first target transmission, where the first target transmission is transmission, of the first transmission and the second transmission, that is determined based on an interface type parameter;

when QoS indicators corresponding to the first transmission and the second transmission are different, discarding second target transmission, or reducing a transmit power of the second target transmission, where the second target transmission is transmission, of the first transmission and the second transmission, that corresponds to a lower priority or a higher delay budget;

when service types corresponding to the first transmission and the second transmission are different, discarding third target transmission, or reducing a transmit power of the third target transmission, where the third target transmission is transmission, of the first transmission and the second transmission, that corresponds to a service type with a higher priority, or transmission, of the first transmission and the second transmission, that corresponds to a service type not belonging to a preset service type;

when channel types or signal types corresponding to the first transmission and the second transmission are different, discarding fourth target transmission, or reducing a transmit power of the fourth target transmission, where the fourth target transmission is transmission, of the first transmission and the second transmission, that corresponds to a channel type or a signal type with a higher priority, or transmission, of the first transmission and the second transmission, that corresponds to a channel type or a signal type not belonging to a preset type;

when frequency parameters of transmission resources corresponding to the first transmission and the second transmission are different, discarding fifth target transmission, or reducing a transmit power of the fifth target transmission, where the fifth target transmission is transmission, of the first transmission and the second transmission, that corresponds to a transmission resource whose frequency parameter has a higher priority, or transmission, of the first transmission and the second transmission, that corresponds to a transmission resource whose frequency parameter does not belong to a preset frequency parameter;

when transmission resource pools or transmission resource patterns corresponding to the first transmission and the second transmission are different, discarding sixth target transmission, or reducing a transmit power of the sixth target transmission, where the sixth target transmission is transmission, of the first transmission and the second transmission, that corresponds to a transmission resource pool or a transmission resource pattern with a higher priority, or transmission, of the first transmission and the second transmission, that corresponds to a transmission resource pool or a transmission resource pattern not belonging to a preset transmission resource pool or transmission resource pattern;

when data transmission types corresponding to the first transmission and the second transmission are different, discarding seventh target transmission, or reducing a transmit power of the seventh target transmission, where the seventh target transmission is transmission, of the first transmission and the second transmission, that corresponds to a data transmission type with a higher priority, or transmission, of the first transmission and the second transmission, that corresponds to a data transmission type not belonging to a preset data transmission type;

when resource allocation objects corresponding to the first transmission and the second transmission are different, discarding eighth target transmission, or reducing a transmit power of the eighth target transmission, where the eighth target transmission is transmission, of the first transmission and the second transmission, that corresponds to a resource allocation object with a higher priority, or transmission, of the first transmission and the second transmission, that corresponds to a resource allocation object not belonging to a preset resource allocation object;

when resource allocation modes corresponding to the first transmission and the second transmission are different, discarding ninth target transmission, or reducing a transmit power of the ninth target transmission, where the ninth target transmission is transmission, of the first transmission and the second transmission, that corresponds to a resource allocation mode with a higher priority, or transmission, of the first transmission and the second transmission, that corresponds to a resource allocation mode not belonging to a preset resource allocation mode; and calculating collision weights of the first transmission and the second transmission based on the mapping relationship between a transmission parameter and a collision weight, determining tenth target transmission from the first transmission and the second transmission, and discarding the tenth transmission, or reducing a transmit power of the tenth target transmission.

Optionally, when one of the first transmission and the second transmission is transmission performed based on a sidelink, and the other one is transmission performed based on a Uu interface, the first target transmission is the transmission performed based on the sidelink;

or when one of the first transmission and the second transmission is transmission performed based on LTE, and the other one is transmission performed based on NR, the first target transmission is the transmission performed based on NR.

The terminal 600 can implement various processes that are implemented by the terminal in the foregoing embodiments. To avoid repetition, details are not described herein again. During data transmission in a plurality of different transmission modes, the terminal 600 in this embodiment of this disclosure may process a collision in the data transmission according to the collision processing policy, to resolve problems in multi-mode data transmission, such as a sending/receiving collision, a limited power, and interference.

It should be understood that, in this embodiment of this disclosure, the radio frequency unit 601 may be configured to send or receive a signal in an information sending/receiving or call process. Specifically, the radio frequency unit 601 receives downlink data from a base station and sends the downlink data to the processor 610 for processing; and sends uplink data to the base station. Usually, the radio frequency unit 601 includes but is not limited to an antenna, at least one amplifier, a transceiver, a coupler, a low noise amplifier, a duplexer, and the like. In addition, the radio frequency unit 601 may further communicate with a network and another device by using a wireless communications system.

The terminal 600 provides the user with wireless broadband Internet access by using the network module 602, for example, helps the user send or receive an email, browse a web page, access streaming media, and the like.

The audio output unit 603 may convert audio data into an audio signal, and output the audio signal as sound, where the audio data is received by the radio frequency unit 601 or the network module 602, or is stored in the memory 609. In addition, the audio output unit 603 may further provide audio output (for example, a call signal reception tone or a message reception tone) that is related to a specific function performed by the terminal 600. The audio output unit 603 includes a loudspeaker, a buzzer, a phone receiver, and the like.

The input unit 604 is configured to receive an audio signal or a video signal. The input unit 604 may include a graphics processing unit (Graphics Processing Unit, GPU) 6041 and a microphone 6042. The graphics processing unit 6041 processes image data of a static picture or a video that is obtained by an image capture apparatus (for example, a camera) in a video capture mode or an image capture mode. A processed image frame may be displayed on the display unit 606. An image frame processed by the graphics processing unit 6041 may be stored in the memory 609 (or another storage medium), or may be sent by the radio frequency unit 601 or the network module 602. The microphone 6042 may receive a sound, and can process the sound into audio data. In a phone call mode, processed audio data may be converted, for output, into a format for transmission by the radio frequency unit 601 to a mobile communications base station.

The terminal 600 further includes at least one sensor 605, for example, an optical sensor, a motion sensor, and another sensor. Specifically, the optical sensor includes an ambient light sensor and a proximity sensor. The ambient light sensor may adjust brightness of a display panel 6061 based on intensity of ambient light. When the terminal 600 moves near an ear, the proximity sensor may disable the display panel 6061 and/or backlight. As a motion sensor, an accelerometer sensor may detect a value of an acceleration in various directions (there are usually three axes), may detect a value and a direction of gravity when the terminal is still, and may be configured to recognize a posture of the terminal (for example, landscape/portrait mode switching, a related game, or magnetometer posture calibration), provide a function related to vibration recognition (for example, a pedometer or a keystroke), or the like. The sensor 605 may further include a fingerprint sensor, a pressure sensor, an iris sensor, a molecular sensor, a gyroscope, a barometer, a hygrometer, a thermometer, or an infrared sensor. Details are not described herein.

The display unit 606 is configured to display information entered by the user or information provided for the user. The display unit 606 may include the display panel 6061. Optionally, the display panel 6061 may be configured in a form of a liquid crystal display (LCD), an organic light-emitting diode (OLED), or the like.

The user input unit 607 may be configured to receive entered numerical or character information, and generate key signal input that is related to a user setting and function control of the terminal. Specifically, the user input unit 607 includes a touch panel 6071 and other input devices 6072. The touch panel 6071 is also referred to as a touchscreen, and may collect a touch operation of the user on or near the touch panel (for example, an operation performed on or near the touch panel 6071 by the user by using any appropriate object or accessory such as a finger or a stylus). The touch panel 6071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, sends the contact coordinates to the processor 610, receives a command sent by the processor 610, and executes the command In addition, the touch panel 6071 may be implemented in a plurality of types, for example, a resistive type, a capacitive type, an infrared type, and a surface acoustic wave. In addition to the touch panel 6071, the user input unit 607 may further include the other input devices 6072. Specifically, the other input devices 6072 may include but are not limited to a physical keyboard, a function key (for example, a volume control key or a power on/off key), a track ball, a mouse, and a joystick. Details are not described herein.

Further, the touch panel 6071 may cover the display panel 6061. After detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. In FIG. 6, the touch panel 6071 and the display panel 6061 serve as two independent components to implement input and output functions of the terminal. However, in some embodiments, the touch panel 6071 and the display panel 6061 may be integrated to implement the input and output functions of the terminal. This is not specifically limited herein.

The interface unit 608 is an interface for connecting an external apparatus to the terminal 600. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 608 may be configured to receive input (for example, data information and electric power) from the external apparatus, and transmit the received input to one or more elements in the terminal 600; or may be configured to transmit data between the terminal 600 and the external apparatus.

The memory 609 may be configured to store software programs and various types of data. The memory 609 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone, and the like. In addition, the memory 609 may include a high-speed random access memory, or may include a nonvolatile memory, for example, at least one magnetic disk storage device, a flash memory device, or another volatile solid-state storage device.

The processor 610 is a control center of the terminal, connects various parts of the entire terminal by using various interfaces and lines, and executes various functions and data processing of the terminal by running or executing a software program and/or a module stored in the memory 609 and invoking data stored in the memory 609, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It can be understood that the modem processor may be alternatively not integrated in the processor 610.

The terminal 600 may further include a power supply 611 (for example, a battery) that supplies power to each component. Optionally, the power supply 611 may be logically connected to the processor 610 by using a power management system, so as to implement functions such as charging management, discharging management, and power consumption management by using the power management system.

In addition, the terminal 600 may include some functional modules that are not shown. Details are not described herein.

Optionally, an embodiment of this disclosure further provide a terminal, including a processor 610, a memory 609, and a computer program stored in the memory 609 and capable of running on the processor 610. When the computer program is executed by the processor 610, the processes in the foregoing embodiments of the transmission processing method are implemented, and a same technical effect can be achieved. To avoid repetition, details are not described herein again.

An embodiment of this disclosure further provides a computer-readable storage medium. The computer-readable storage medium stores a computer program, and when the computer program is executed by a processor, the processes in the embodiment of the transmission processing method shown in FIG. 1 are implemented, and a same technical effect can be achieved. To avoid repetition, details are not described herein again. For example, the computer-readable storage medium is a read-only memory (ROM), a random access memory (RAM), a magnetic disc, an optical disk, or the like.

Figure 7:
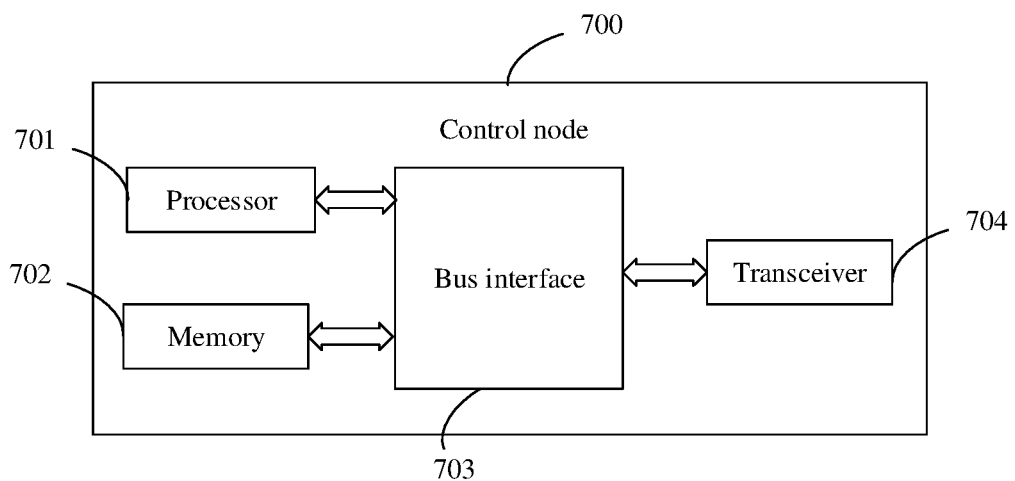
FIG. 7 is a schematic diagram of a hardware structure of a control node according to an embodiment of this disclosure.

FIG. 7 is a structural diagram of another control node according to an embodiment of this disclosure. As shown in FIG. 7, the control node 700 includes a processor 701, a memory 702, a bus interface 703, and a transceiver 704. The processor 701, the memory 702, and the transceiver 704 are all connected to the bus interface 703.

In this embodiment of this disclosure, the control node 700 further includes a computer program stored in the memory 702 and capable of running on the processor 701. When the computer program is executed by the processor 701, the following step is implemented:

sending a collision processing policy, where the collision processing policy is used to perform collision processing on first transmission and second transmission that collide.

At least one of the first transmission and the second transmission is transmission performed based on a sidelink, and transmission modes of the first transmission and the second transmission are different.

Optionally, the sidelink is a new radio NR sidelink.

Optionally, the collision processing policy is related to at least one of the following:

an interface type parameter, a QoS parameter, a service type, a channel type parameter, a signal type parameter, a transmission resource frequency parameter, a resource pool priority parameter, a resource pattern priority parameter, a data transmission type parameter, a resource allocation mode, a resource allocation object parameter, and a mapping relationship between a transmission parameter and a collision weight.

Optionally, when being executed by the processor 701, the computer program is further used to:

send a validation condition for the collision processing policy.

The control node 700 can implement various processes that are implemented by the control node in the foregoing embodiments. To avoid repetition, details are not described herein again. When performing data transmission with a terminal in a plurality of different transmission modes, the control node 700 in this embodiment of this disclosure may send the collision processing policy to the terminal, so as to negotiate with the terminal on how to process a collision in the data transmission according to the collision processing policy, and resolve problems in multi-mode data transmission, such as a sending/receiving collision, a limited power, and interference.

An embodiment of this disclosure further provides a computer-readable storage medium. The computer-readable storage medium stores a computer program, and when the computer program is executed by a processor, the processes in the embodiment of the transmission processing method shown in FIG. 2 are implemented, and a same technical effect can be achieved. To avoid repetition, details are not described herein again. The computer-readable storage medium is, for example, a ROM, a RAM, a magnetic disc, or an optical disk.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

Based on the foregoing descriptions of the implementations, a person skilled in the art may clearly understand that the method in the foregoing embodiments may be implemented by software and a necessary general-purpose hardware platform, or certainly, may be implemented by hardware. In many cases, the implementation by using the software and the necessary general-purpose hardware platform is a better implementation. Based on such an understanding, the technical solutions of this disclosure essentially, or a part contributing to the prior art may be implemented in a form of a software product. The computer software product is stored in a storage medium (for example, a ROM/RAM, a magnetic disc, or an optical disk), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementations. The foregoing specific implementations are merely examples, and do not constitute a limitation. Inspired by this disclosure, a person of ordinary skill in the art can make many variations without departing from the essence of this disclosure or the protection scope of the claims. All these variations shall fall within the protection scope of this disclosure.

The invention claimed is:

1. A transmission processing method, comprising:
when first transmission collides with second transmission, performing, by a terminal, collision processing on the first transmission and the second transmission according to a collision processing policy, wherein
at least one of the first transmission and the second transmission is transmission performed based on a sidelink, and transmission modes of the first transmission and the second transmission are different;
wherein the collision processing policy is related to a channel type parameter or a signal type parameter, the first transmission and the second transmission correspond to different channel types or different signal types, and priorities of the different channel types or the different signal types are predefined;
wherein the collision processing policy specifically comprises at least one of the following policies:
when frequency parameters of transmission resources corresponding to the first transmission and the second transmission are different, discarding fifth target transmission, or reducing a transmit power of the fifth target transmission, wherein the fifth target transmission is transmission, of the first transmission and the second transmission, that corresponds to a transmission resource whose frequency parameter has a lower priority, or transmission, of the first transmission and the second transmission, that corresponds to a transmission resource whose frequency parameter does not belong to a preset frequency parameter;
when resource allocation objects corresponding to the first transmission and the second transmission are different, discarding eighth target transmission, or reducing a transmit power of the eighth target transmission, wherein the eighth target transmission is transmission, of the first transmission and the second transmission, that corresponds to a resource allocation object with a lower priority, or transmission, of the first transmission and the second transmission, that corresponds to a resource allocation object not belonging to a preset resource allocation object;
when resource allocation modes corresponding to the first transmission and the second transmission are different, discarding ninth target transmission, or reducing a transmit power of the ninth target transmission, wherein the ninth target transmission is transmission, of the first transmission and the second transmission, that corresponds to a resource allocation mode with a lower priority, or transmission, of the first transmission and the second transmission, that corresponds to a resource allocation mode not belonging to a preset resource allocation mode; and
calculating collision weights of the first transmission and the second transmission based on the mapping relationship between a transmission parameter and a collision weight, determining tenth target transmission from the first transmission and the second transmission, and discarding the tenth target transmission, or reducing a transmit power of the tenth target transmission.

2. The transmission processing method according to claim 1, wherein the sidelink is a new radio (NR) sidelink.

3. The transmission processing method according to claim 1, wherein the collision processing policy is further related to at least one of the following:
an interface type parameter, a quality of service (QoS) parameter, a service type, a transmission resource frequency parameter, a resource pool priority parameter, a resource pattern priority parameter, a data transmission type parameter, a resource allocation mode, a resource allocation object parameter, a mapping relationship between a transmission parameter and a collision weight, and a terminal capability parameter.

4. The transmission processing method according to claim 1, wherein the collision processing policy is a protocol-predefined policy, a preconfigured policy, or a control node-configured policy.

5. The transmission processing method according to claim 1, wherein a validation condition for the collision processing policy is a protocol-predefined trigger condition, a preconfigured validation condition, or a control node-configured validation condition.

6. The transmission processing method according to claim 1, wherein the collision processing policy comprises a collision processing operation, and the collision processing operation comprises at least one of the following operations: a discarding operation of receiving, a discarding operation of sending, and transmit power reduction.

7. The transmission processing method according to claim 1, wherein the collision processing policy further comprises at least one of the following policies:
when interface types of the first transmission and the second transmission are different, discarding first target transmission, or reducing a transmit power of the first target transmission, wherein the first target transmission is transmission, of the first transmission and the second transmission, that is determined based on an interface type parameter;
when quality of service (QoS) indicators corresponding to the first transmission and the second transmission are different, discarding second target transmission, or reducing a transmit power of the second target transmission, wherein the second target transmission is transmission, of the first transmission and the second transmission, that corresponds to a lower priority or a higher delay budget;
when service types corresponding to the first transmission and the second transmission are different, discarding third target transmission, or reducing a transmit power of the third target transmission, wherein the third target transmission is transmission, of the first transmission and the second transmission, that corresponds to a service type with a lower priority, or transmission, of the first transmission and the second transmission, that corresponds to a service type not belonging to a preset service type;
when channel types or signal types corresponding to the first transmission and the second transmission are different, discarding fourth target transmission, or reducing a transmit power of the fourth target transmission, wherein the fourth target transmission is transmission, of the first transmission and the second transmission, that corresponds to a channel type or a signal type with a lower priority, or transmission, of the first transmission and the second transmission, that corresponds to a channel type or a signal type not belonging to a preset type;
when transmission resource pools or transmission resource patterns corresponding to the first transmission and the second transmission are different, discarding sixth target transmission, or reducing a transmit power of the sixth target transmission, wherein the sixth target transmission is transmission, of the first transmission and the second transmission, that corresponds to a transmission resource pool or a transmission resource pattern with a lower priority, or transmission, of the first transmission and the second transmission, that corresponds to a transmission resource pool or a transmission resource pattern not belonging to a preset transmission resource pool or transmission resource pattern;
when data transmission types corresponding to the first transmission and the second transmission are different, discarding seventh target transmission, or reducing a transmit power of the seventh target transmission, wherein the seventh target transmission is transmission, of the first transmission and the second transmission, that corresponds to a data transmission type with a lower priority, or transmission, of the first transmission and the second transmission, that corresponds to a data transmission type not belonging to a preset data transmission type.

8. The transmission processing method according to claim 7, wherein when one of the first transmission and the second transmission is transmission performed based on a sidelink, and the other one is transmission performed based on a Uu interface, the first target transmission is the transmission performed based on the sidelink;

or when one of the first transmission and the second transmission is transmission performed based on long term evolution (LTE), and the other one is transmission performed based on new radio (NR), the first target transmission is the transmission performed based on NR.

9. The transmission processing method according to claim 1, wherein priorities of transmissions corresponding to the different signal types are different, and the transmissions corresponding to the different signal types comprises a transmission with a channel state information (CSI) feedback and another transmission without a CSI feedback.

10. The transmission processing method according to claim 1, wherein a priority of the first transmission with a channel state information (CSI) feedback is different from a priority of the second transmission without a CSI feedback; or, a priority of the first transmission with a CSI feedback is lower than a priority of the second transmission without a CSI feedback.

11. A terminal, comprising a processor, a memory, and a computer program stored in the memory and capable of running on the processor, wherein when the computer program is executed by the processor, the processor is configured to:

when first transmission collides with second transmission, perform collision processing on the first transmission and the second transmission according to a collision processing policy, wherein at least one of the first transmission and the second transmission is transmission performed based on a sidelink, and transmission modes of the first transmission and the second transmission are different;

wherein the collision processing policy is related to a channel type parameter or a signal type parameter, the first transmission and the second transmission correspond to different channel types or different signal types, and priorities of the different channel types or the different signal types are predefined;

wherein the collision processing policy specifically comprises at least one of the following policies:

when frequency parameters of transmission resources corresponding to the first transmission and the second transmission are different, discarding fifth target transmission, or reducing a transmit power of the fifth target transmission, wherein the fifth target transmission is transmission, of the first transmission and the second transmission, that corresponds to a transmission resource whose frequency parameter has a lower priority, or transmission, of the first transmission and the second transmission, that corresponds to a transmission resource whose frequency parameter does not belong to a preset frequency parameter;

when resource allocation objects corresponding to the first transmission and the second transmission are different, discarding eighth target transmission, or reducing a transmit power of the eighth target transmission, wherein the eighth target transmission is transmission, of the first transmission and the second transmission, that corresponds to a resource allocation object with a lower priority, or transmission, of the first transmission and the second transmission, that corresponds to a resource allocation object not belonging to a preset resource allocation object;

when resource allocation modes corresponding to the first transmission and the second transmission are different, discarding ninth target transmission, or reducing a transmit power of the ninth target transmission, wherein the ninth target transmission is transmission, of the first transmission and the second transmission, that corresponds to a resource allocation mode with a lower priority, or transmission, of the first transmission and the second transmission, that corresponds to a resource allocation mode not belonging to a preset resource allocation mode; and calculating collision weights of the first transmission and the second transmission based on the mapping relationship between a transmission parameter and a collision weight, determining tenth target transmission from the first transmission and the second transmission, and discarding the tenth transmission, or reducing a transmit power of the tenth target transmission.

12. The terminal according to claim 11, wherein the sidelink is a new radio (NR) sidelink.

13. The terminal according to claim 11, wherein the collision processing policy is further related to at least one of the following:

an interface type parameter, a quality of service (QoS) parameter, a service type, a transmission resource frequency parameter, a resource pool priority parameter, a resource pattern priority parameter, a data transmission type parameter, a resource allocation mode, a resource allocation object parameter, a mapping relationship between a transmission parameter and a collision weight, and a terminal capability parameter.

14. The terminal according to claim 11, wherein the collision processing policy is a protocol-predefined policy, a preconfigured policy, or a control node-configured policy.

15. The terminal according to claim 11, wherein a validation condition for the collision processing policy is a protocol-predefined trigger condition, a preconfigured validation condition, or a control node-configured validation condition.

16. The terminal according to claim 11, wherein the collision processing policy comprises a collision processing operation, and the collision processing operation comprises at least one of the following operations: a discarding operation of receiving, a discarding operation of sending, and transmit power reduction.

17. The terminal according to claim 11, wherein the collision processing policy further comprises at least one of the following policies:

when interface types of the first transmission and the second transmission are different, discarding first target transmission, or reducing a transmit power of the first target transmission, wherein the first target transmission is transmission, of the first transmission and the second transmission, that is determined based on an interface type parameter;

when quality of service (QoS) indicators corresponding to the first transmission and the second transmission are different, discarding second target transmission, or reducing a transmit power of the second target transmission, wherein the second target transmission is transmission, of the first transmission and the second transmission, that corresponds to a lower priority or a higher delay budget;

when service types corresponding to the first transmission and the second transmission are different, discarding third target transmission, or reducing a transmit power of the third target transmission, wherein the third target transmission is transmission, of the first transmission and the second transmission, that corresponds to a service type with a lower priority, or transmission, of the first transmission and the second transmission, that corresponds to a service type not belonging to a preset service type;

when channel types or signal types corresponding to the first transmission and the second transmission are different, discarding fourth target transmission, or reducing a transmit power of the fourth target transmission, wherein the fourth target transmission is transmission, of the first transmission and the second transmission, that corresponds to a channel type or a signal type with a lower priority, or transmission, of the first transmission and the second transmission, that corresponds to a channel type or a signal type not belonging to a preset type;

when transmission resource pools or transmission resource patterns corresponding to the first transmission and the second transmission are different, discarding sixth target transmission, or reducing a transmit power of the sixth target transmission, wherein the sixth target transmission is transmission, of the first transmission and the second transmission, that corresponds to a transmission resource pool or a transmission resource pattern with a lower priority, or transmission, of the first transmission and the second transmission, that corresponds to a transmission resource pool or a transmission resource pattern not belonging to a preset transmission resource pool or transmission resource pattern;

when data transmission types corresponding to the first transmission and the second transmission are different, discarding seventh target transmission, or reducing a transmit power of the seventh target transmission, wherein the seventh target transmission is transmission, of the first transmission and the second transmission, that corresponds to a data transmission type with a lower priority, or transmission, of the first transmission and the second transmission, that corresponds to a data transmission type not belonging to a preset data transmission type.

18. The terminal according to claim 17, wherein when one of the first transmission and the second transmission is transmission performed based on a sidelink, and the other one is transmission performed based on a Uu interface, the first target transmission is the transmission performed based on the sidelink;

or when one of the first transmission and the second transmission is transmission performed based on long term evolution (LTE), and the other one is transmission performed based on new radio (NR), the first target transmission is the transmission performed based on NR.

19. A control node, comprising a processor, a memory, and a computer program stored in the memory and capable of running on the processor, wherein when the computer program is executed by the processor, the processor is configured to: send a collision processing policy, wherein the collision processing policy is used to perform collision processing on first transmission and second transmission that collide, wherein at least one of the first transmission and the second transmission is transmission performed based on a sidelink, and transmission modes of the first transmission and the second transmission are different;

wherein the collision processing policy is related to a channel type parameter or a signal type parameter, the first transmission and the second transmission correspond to different channel types or different signal types, and priorities of the different channel types or the different signal types are predefined;

wherein the collision processing policy specifically comprises at least one of the following policies:

when frequency parameters of transmission resources corresponding to the first transmission and the second transmission are different, discarding fifth target transmission, or reducing a transmit power of the fifth target transmission, wherein the fifth target transmission is transmission, of the first transmission and the second transmission, that corresponds to a transmission resource whose frequency parameter has a lower priority, or transmission, of the first transmission and the second transmission, that corresponds to a transmission resource whose frequency parameter does not belong to a preset frequency parameter;

when resource allocation objects corresponding to the first transmission and the second transmission are different, discarding eighth target transmission, or reducing a transmit power of the eighth target transmission, wherein the eighth target transmission is transmission, of the first transmission and the second transmission, that corresponds to a resource allocation object with a lower priority, or transmission, of the first transmission and the second transmission, that corresponds to a resource allocation object not belonging to a preset resource allocation object;

when resource allocation modes corresponding to the first transmission and the second transmission are different, discarding ninth target transmission, or reducing a transmit power of the ninth target transmission, wherein the ninth target transmission is transmission, of the first transmission and the second transmission, that corresponds to a resource allocation mode with a lower priority, or transmission, of the first transmission and the second transmission, that corresponds to a resource allocation mode not belonging to a preset resource allocation mode; and calculating collision weights of the first transmission and the second transmission based on the mapping relationship between a transmission parameter and a collision weight, determining tenth target transmission from the first transmission and the second transmission, and discarding the tenth transmission, or reducing a transmit power of the tenth target transmission.

20. The control node according to claim 19, wherein the collision processing policy is further related to at least one of the following:

an interface type parameter, a quality of service (QoS) parameter, a service type, a transmission resource frequency parameter, a resource pool priority parameter, a resource pattern priority parameter, a data transmission type parameter, a resource allocation mode, a resource allocation object parameter, a mapping relationship between a transmission parameter and a collision weight, and a terminal capability parameter.

* * * * *